(12) United States Patent
Zweig et al.

(10) Patent No.: US 8,965,765 B2
(45) Date of Patent: Feb. 24, 2015

(54) STRUCTURED MODELS OF REPETITION FOR SPEECH RECOGNITION

(75) Inventors: Geoffrey G. Zweig, Sammamish, WA (US); Xiao Li, Bellevue, WA (US); Dan Bohus, Kirkland, WA (US); Alejandro Acero, Bellevue, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1195 days.

(21) Appl. No.: 12/233,826

(22) Filed: Sep. 19, 2008

(65) Prior Publication Data

US 2010/0076765 A1    Mar. 25, 2010

(51) Int. Cl.
*G10L 15/00* (2013.01)
*G10L 15/18* (2013.01)

(52) U.S. Cl.
CPC .................. *G10L 15/1822* (2013.01)
USPC ........................... 704/251; 704/255

(58) Field of Classification Search
USPC ................ 704/231, 251, 255, 257
See application file for complete search history.

(56) References Cited

U.S. PATENT DOCUMENTS

| | | | |
|---|---|---|---|
| 5,640,485 A | 6/1997 | Ranta | |
| 5,710,866 A | 1/1998 | Alleva et al. | |
| 5,737,724 A | 4/1998 | Atal et al. | |
| 6,195,635 B1 * | 2/2001 | Wright | 704/231 |
| 6,725,197 B1 * | 4/2004 | Wuppermann et al. | 704/251 |
| 7,228,275 B1 * | 6/2007 | Endo et al. | 704/235 |
| 7,321,856 B1 | 1/2008 | Porter et al. | |
| 2002/0156628 A1 | 10/2002 | Peters | |
| 2002/0188421 A1 * | 12/2002 | Tanigaki et al. | 702/181 |
| 2004/0249637 A1 * | 12/2004 | Baker | 704/239 |
| 2005/0159950 A1 * | 7/2005 | Roth et al. | 704/236 |
| 2007/0073540 A1 | 3/2007 | Hirakawa et al. | |
| 2007/0192101 A1 | 8/2007 | Braho et al. | |
| 2007/0288242 A1 | 12/2007 | Spengler et al. | |
| 2008/0059167 A1 | 3/2008 | Poultney et al. | |

OTHER PUBLICATIONS

"Asynchronous Articulatory Feature Recognition Using Dynamic Bayesian Networks", (Retrieved Jun. 6, 2008), Webpage Available at: http://66.102.1.104/scholar?hl=en&lr=&q=cache:pMf2wAnkz44J:www.era.lib.ed.ac.uk/handle/1842/923.

Itoh, et al., "An Algorithm for Similar Utterance Section Extraction for Managing Spoken Documents", Multimedia Systems (2005), Regular Paper, pp. 432-443.

(Continued)

*Primary Examiner* — Angela A Armstrong
(74) *Attorney, Agent, or Firm* — Sandy Swain; Peter Taylor; Micky Minhas

(57) ABSTRACT

Described is a technology by which a structured model of repetition is used to determine the words spoken by a user, and/or a corresponding database entry, based in part on a prior utterance. For a repeated utterance, a joint probability analysis is performed on (at least some of) the corresponding word sequences as recognized by one or more recognizers) and associated acoustic data. For example, a generative probabilistic model, or a maximum entropy model may be used in the analysis. The second utterance may be a repetition of the first utterance using the exact words, or another structural transformation thereof relative to the first utterance, such as an extension that adds one or more words, a truncation that removes one or more words, or a whole or partial spelling of one or more words.

19 Claims, 4 Drawing Sheets

(56) References Cited

OTHER PUBLICATIONS

White, et al., "Maximum Entropy Confidence Estimation for Speech Recognition", IEEE International Conference on Acoustics, Speech and Signal Processing, ICASSP 2007, pp. 809-812.

Nair, et al., "Joint Decoding of Multiple Speech Patterns for Robust Speech Recognition", ASRU, IEEE, 2007, pp. 93-98.

Horvitz, et al., "Deep Listener: Harnessing Expected Utility to Guide Clarification Dialog in Spoken Language Systems", Microsoft Research, 2000, 4 pages.

Bohus, et al., "A K Hypotheses + Other Belief Updating Model", AAAI Workshop on Statistical and Empirical Approaches to Spoken Dialogue Systems, 2006, 6 pages.

Oviatt, et al., "Modeling Hyperarticulate Speech during Human-Computer Error Resolution", Fourth International Conference on Spoken Language, ICSLP, vol. 2, Oct. 3-6, 1996, pp. 801-804.

Bell, et al., "Repetition and its Phonetic Realizations: Investigating a Swedish Database of Spontaneous Computer-Directed Speech", In Proceedings of ICPhS-99, San Francisco. International Congress of Phonetic Sciences, 1999, 4 pages.

Stolcke, et al., "Dialog Act Modeling for Automatic Tagging and Recognition of Conversational Speech", Computational Linguistics, vol. X, No. X, 2000, pp. 1-34.

Li, et al., "Language Modeling for Voice Search: A Machine-Translation Approach", ICASSP, IEEE, 2008, pp. 4913-4916.

Boves, et al., "ASR for Automatic Directory Assistance: The SMADA Project", in Proceedings of ASR 2000, 6 pages.

Acero, et al., "Live Search for Mobile: Web Services by Voice on the Cellphone", ICASSP, IEEE, 2008, pp. 5256-5259.

Bacchiani, et al., "Deploying GOOG-411: Early Lessons in Data, Measurement, and Testing", IEEE International Conference on Acoustics, Speech and Signal Processing, ICASSP, 2008, pp. 5260-5263.

Buntschuh, et al., "VPQ: A Spoken Language Interface to Large Scale Directory Information", In Proceedings of ICSLP 1998, 4 pages.

Kamm, et al., "Speech Recognition Issues for Directory Assistance Applications", Second IEEE Workshop on Interactive Voice Technology for Telecommunications Applications, 1994, pp. 15-19.

Clarkson, et al., "Statistical Language Modeling using the CMU-Cambridge Toolkit", EuroSpeech'97, Sep. 1997, pp. 2707-2710.

\* cited by examiner

STRUCTURED MODELS OF REPETITION FOR SPEECH RECOGNITION

BACKGROUND

In voice-search applications, the need for the speaking person to repeat spoken input is often a frequent occurrence due to speech recognition errors. As a result, automated systems that interact with people via a speech recognition user-interface often make errors that require the user to repeat a request, sometimes multiple times. For example, in an automated speech-recognized telephone directory assistance system, the user may say something like "Police Department," which initially gets recognized as "P Street Apartments," and causes the user to have to repeat the request or attempt some new variation thereof.

The occurrence of repeated requests is quite common across multiple types of automated systems, including directory assistance systems, account access systems and multimodal systems. Indeed, analysis of log records indicates that in some systems, approximately half of all initiated interactions result in repetition. Any improvement in lowering the repetition rate is beneficial.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a structured model of repetition is used to determine the intention associated with a repeated utterance, based in part on consideration of the prior utterance. The intention may be the exact words spoken by a user, and/or an entry (e.g., listing) from among a fixed set of database entries.

In one aspect, using the structured model of repetition comprises performing a joint probability analysis on the word sequences (recognized from the utterances by one or more recognizers) and associated acoustic data. For example, a generative probabilistic model, or a maximum entropy model may be used. In one alternative, only a subset of the word sequences corresponding to the first and second utterances may be used in the analysis.

In one aspect, using the structured model comprises determining that the second utterance has identical words as the first utterance, including that the second utterance has the same or different prosody and stresses than the first utterance.

In one aspect, using the structured model comprises determining that the second utterance is an extension of the first utterance, including that the second utterance adds at least one word before the first utterance, and/or adds at least one word after the first utterance. Similarly, the second utterance may be determined to be a truncation of the first utterance, including that the second utterance has removed at least one before the first utterance, and/or removed at least one word after the first utterance. The second utterance also may spell out at least part of one word that was spoken in the first utterance.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
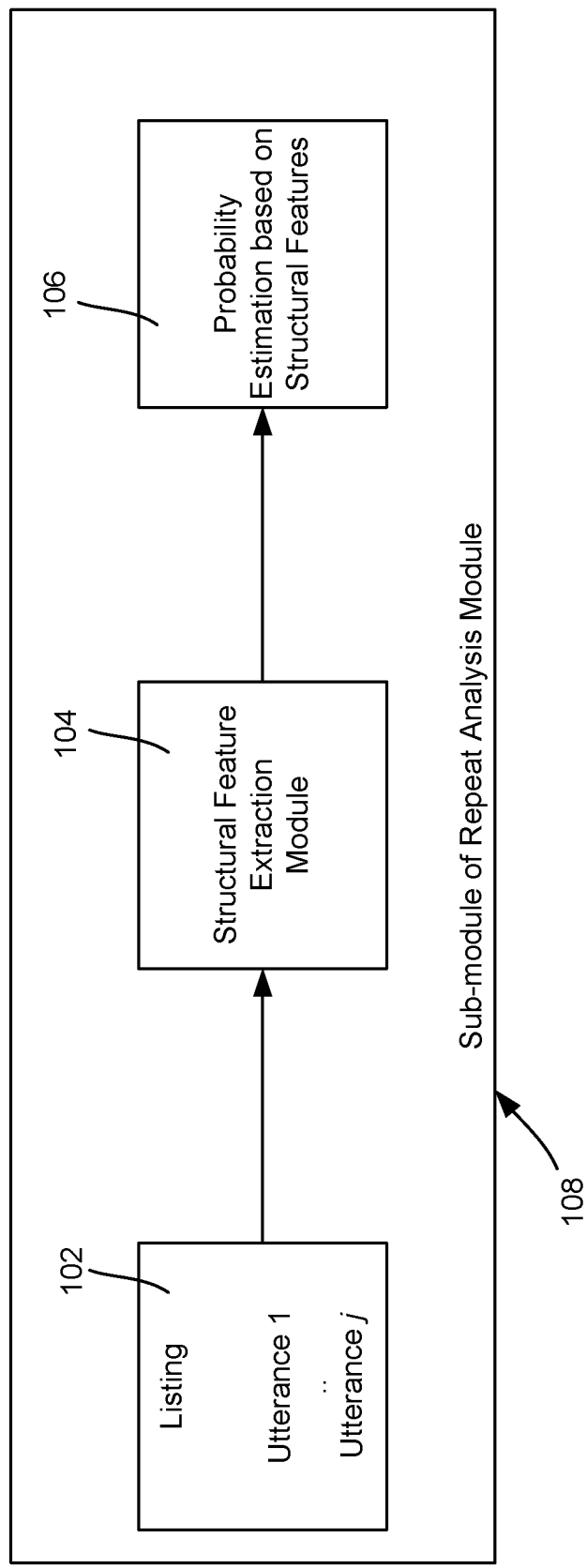
FIG. 1 is a block diagram representing example components repeat analysis.

Various aspects of the technology described herein are generally directed towards using multiple repeated requests for the same item to improve subsequent speech recognition accuracy, e.g., with fewer misunderstandings. In one aspect, this is accomplished by analyzing and exploiting the structural relationships that are present in repeated speech relative to previous speech to more accurately assess what a user said. This may be used for the purpose of attempting to determine the exact words spoken by a user, or to determine the identity of one entry of a fixed set of database entries/listings, e.g. one business among a set of businesses in a phone book.

While many of the examples herein are directed towards certain structural features such as left/right extension, truncation and/or spelling, the technology is not limited to these features, nor need all features be used. Further, while generative probabilistic models and maximum entropy models are described, any model may be used. Thus, any examples used herein are only non-limiting examples for the purposes of describing the technology. As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing and speech processing technology in general.

The technology described herein understands that when repeating an utterance, a user is ordinarily asking for the same thing, and uses that understanding to perform a joint analysis of multiple requests for the same item, while taking advantage of the fact that repetitions may follow patterns that may be learned and represented in systems that harness the set of utterances to better interpret peoples' intentions. By way of background, consider that $w_1$ represents the first word sequence a user says, and $a_1$ represents the acoustics of that utterance, with $w_2, a_2$ being the same for the second utterance and so forth. Known current systems independently find the word sequences $w_1$, $w_2$ to maximize the probabilities $P(w_1|a_1), \ldots, P(w_n|a_n)$ of each utterance, where w represents the word sequences of one or more words, and a represents the acoustic data corresponding to that word sequence.

In contrast, the technology described herein models such repeated utterances together, i.e., $P(w_1, \ldots, w_n | a_1, \ldots a_n)$. This is based on the understanding that the utterances are related, and even if not repeated exactly, on the understanding that a repeated utterance is typically restated as a structural transformation of a previous utterance. For example, a user may structurally transform an utterance by adding or removing a word when repeating, such as "Gulfport Police" being restated as "Gulfport Police Department," or "Social Security Administration" being restated as "Social Security."

Sometimes, a repeat utterance contains exactly the same words as a prior utterance; in some cases, a misrecognition stimulates a repetition comprised of the same words repeated in approximately the same manner or with different prosody and pause structure. People sometimes retry an utterance after a misrecognition with a lower syllabic rate and hyperarticulation of the phrases said more naturally in the initial utterance.

In one aspect, a system may determine the most likely word sequences $w_1, \ldots, w_n$ that the speaker said, given the acoustic realizations of the utterance $a_1, \ldots, a_n$, i.e., $\text{argmax}_{w_1, \ldots, w_n} P(w_1, \ldots, w_n | a_1, \ldots, a_n)$, via a joint analysis of these utterances. In another aspect, consider a database of possible items $\Omega$, such as restaurants, within which the user may want to find an item via a voice search system. As alternatively described herein, a system may determine the likeliest database entry L (or user intention), e.g., $\text{argmax}_L P(L|a_1, \ldots a_n)$, via a joint analysis of the utterances.

In one implementation, this may be accomplished via a generative algorithm based on Bayes rule, the chain rule of probability and marginalization over a set of possible items. In an alternative implementation, this may be accomplished via the use of a maximum entropy model.

Turning to FIG. 1, there is shown a block diagram representing general concepts related to structured models of repetition for speech recognition. Block 102 represents a listing having multiple utterances. Block 104 represents a mechanism that extracts structural features, such as those described above, e.g., left and right extension, truncation and/or spelling. For example, an utterance j may be a prefix of an utterance j−1. Block 106 represents the estimation of a probability value, such as $P(w_2|L,w_1)$, using the example features.

As will be understood, such a structured model does not only relate exact repetitions to each other, but also may use inexact repetitions, which correspond to other structural transformations. Thus, as used herein, the term "repetition" and any of its variants (e.g., "repeat," "repeated," and so forth) does not necessarily mean "exact" repetition, but rather comprises any subsequent speech related to earlier speech, including for the purpose of overcoming any prior recognition error. Examples of inexact repetitions include left and or right extensions (where a user adds a word to the beginning and/or end in an attempt to clarify, e.g., an initial request for "Police" may be re-spoken as "Gulfport Police," "Police Department" or "Gulfport Police Department"). Left and right truncation when submitting a revised request also may be analyzed and exploited, e.g., "Gulfport Police" becomes "Police," or "Gulfport Police Department" becomes "Gulfport Police." Spelling is another possible feature, e.g., when a word such as "Gulfport" is spelled out as spoken letters—G U L F P O R T.

Some of the above behaviors might be described and explicitly modeled as reformulations that are associated with a speaker's attempts to guess a better way to refer to a database entity of interest, given failure of one or more prior utterances, where reformulations of the utterance include, e.g., guesses by the speaker about the more formal titles of an entity that might be better matched to the way the entity is encoded in a database, more common ways for expressing the entity, and for ways that might reduce noise and ambiguity in the system's ability to recognize components of the utterance. Richer statistical user models can be employed so as to explicitly capture probability distributions over different behaviors and such user models can enhance the capability of systems to infer the informational goal associated with multiple utterances. However, simpler models based, on types of structural relationships among adjacent utterances, can provide useful inferences that bypass or augment more general user models.

The below table, Table 1, shows frequencies for examples of structured repetition taken from one analysis (with some hypothetical business names used); "Type/Feature" shows how the second utterance is related to the first:

TABLE 1

| Type/Feature | Frequency | word sequence w1 | word sequence w2 |
|---|---|---|---|
| Exact Match | 46.0% | Coffeeplace | Coffeeplace |
| Right Extension | 6.6% | Coffeehouse | Joe's Coffeehouse |
| Right Truncation | 13.7% | DVDLand Video | DVDLand |
| Left Extension | 1.6% | Supreme's Pizza | Mister Supreme's Pizza |
| Left Truncation | 2.8% | The Very Nice Inn | Very Nice Inn |
| Inclusion | 1.2% | The Social Security Administration | Social Security |
| Cover | 0.4% | Microsoft | The Microsoft Corporation |

Figure 2:
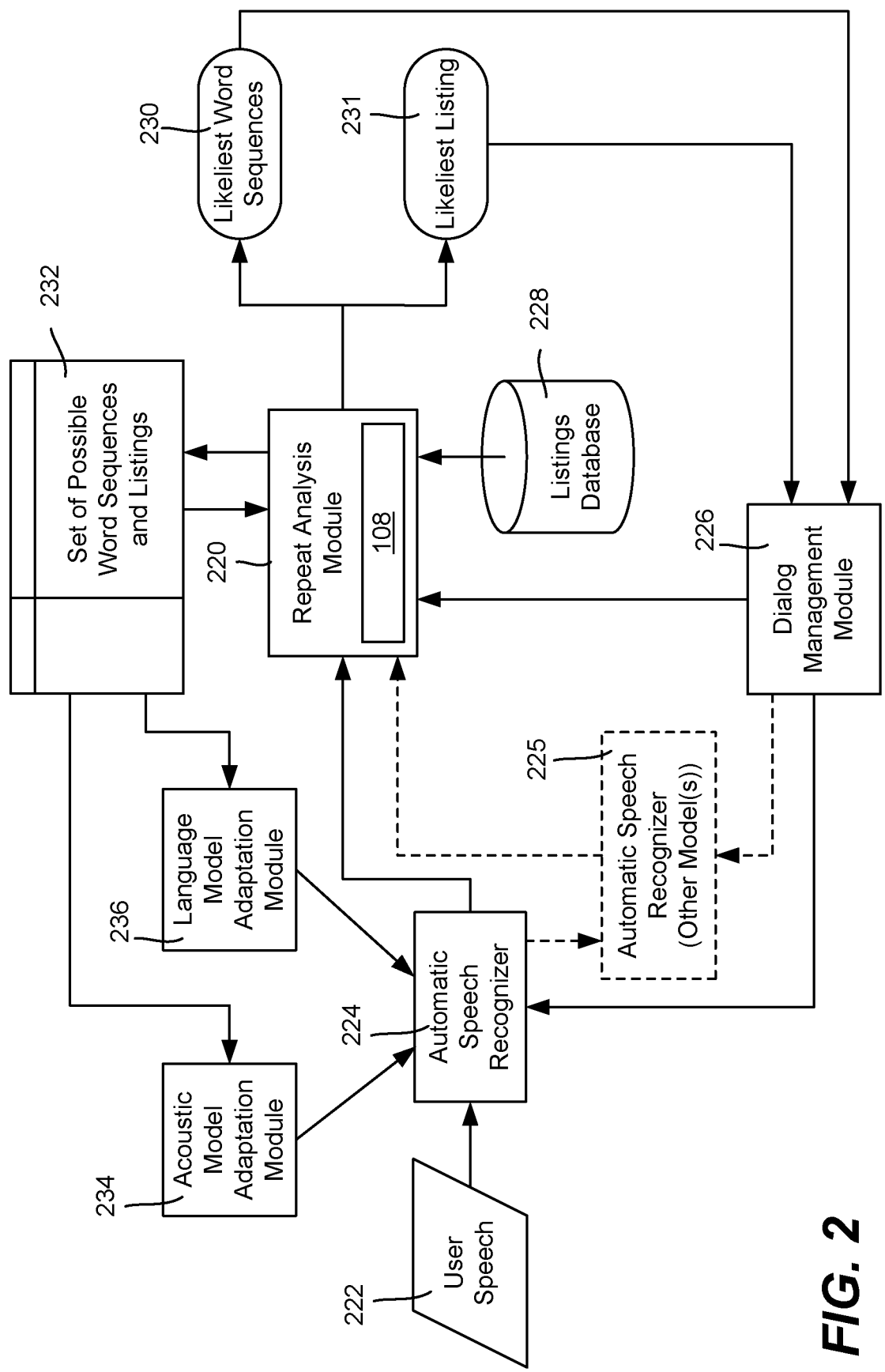
FIG. 2 is a block diagram representing example components in a system in which utterances and repeated utterances are used to provide improved speech recognition accuracy.

In one example implementation, the blocks of FIG. 1 correspond to a sub-module 108 of a repeat analysis module 220 as generally represented in the block diagram of FIG. 2. More particularly, in the example system of FIG. 2, user speech 222 is input to the system, where it is analyzed by a speech recognizer 224 to produce one or more possible word sequences as the output. These are sent to the repeat analysis module 220.

The dialog management module 226 tracks whether the user is initially providing speech or is providing repeated speech (including more than a single repeat). As described herein, depending on the state of the dialog management module 226, the repeat analysis module 220 may forward the output (when the user has not been prompted for a repetition), or analyze the speech recognition output in light of the previous utterances (when the user has been prompted for a repetition). Such an output may be a spoken reply prompt for the purposes of confirmation; however in other systems, a list of alternates may be returned, such as for displaying on a mobile device to facilitate selection.

In the event that the user is repeating speech, the same recognizer may be used, with any identical results bypassed in view of another (e.g., the next most probable) alternate. However, as represented by the dashed block 225, one or more other, different recognizer models may be employed, such as to provide alternate recognition results from a different recognizer.

In the case that speech is repeated and analysis is required, the analysis may be performed to achieve one of two objectives (or possibly both), namely to find the likeliest word sequences uttered by the user, or to find the likeliest listing desired by the user. For matching a listing, a listings database 228 or the like provides the set of possible listings from which the likeliest listing is determined.

In one implementation, the repeat analysis module 220 determines the most likely word sequences 230 and/or listing 231 as set forth below.

To find the likeliest word sequences (for one initial speech input and one repeated speech input; note that this is an approximation, not an exact equality because of the independencies that are implicit in this formulation):

$$\text{argmax}_{w_1,w_2} P(w_1, w_2|a_1, a_2) \approx$$
$$\text{argmax}_{w_1,w_2} \sum_{L \in \Omega} P(L)P(w_1|L)P(w_2|L, w_1)P(a_1|w_1)P(a_2|a_1, w_1, w_2)$$

Note that some of the conditioning variables present in a full application of the chain rule are dropped. For example, L has been dropped in the factors $P(a_1|w_1)$ and $P(a_2|w_1,a_1,w_2)$. It is understood that many such conditional independence assumptions are possible and that there is opportunity to characterize errors associated with alternate independence assumptions empirically.

To find the likeliest listing (similarly approximated):

$$\text{argmax}_{L \in \Omega} P(L|a_1, a_2) \approx$$
$$\text{argmax}_{L \in \Omega} \sum_{w_1,w_2} P(L)P(w_1|L)P(w_2|L, w_1)P(a_1|w_1)P(a_2|a_1, w_1, w_2).$$

For additional utterances, the above may be extended for more than two inputs, e.g., via $a_1, a_2, a_3, w_1, w_2, w_3$ and so on via the chain rule of probability. Note that different weights may be used, and/or other ways to combine the data may be used.

In this manner, the probability of a repeated utterance matching a word sequence or a listing is computed based on a combination of the previous utterance and the repeated utterance (and if necessary, any intervening utterance or utterances). Further, note that a maximum entropy model may be alternatively used to directly compute $\text{argmax}_{w_1,\ldots,w_n} P(w_1, \ldots, w_n|a_1, \ldots a_n)$ or $\text{argmax}_L P(L|a_1, \ldots a_n)$ using features derived from the decoded outputs.

In computing these maximizations and sums, the set of word sequences $w_1, w_2$ are considered in a limited set for practical reasons. In theory, all possible word sequences can be considered, but because there are an infinite number of such possibilities, in practice this is impossible. Therefore, a dynamic determination is made as to which of the various $w_1$ and $w_2$ sequences to sum over in the equations. One way to make such a dynamic determination is to consider only word sequences that are phonetically similar on the n-best lists of the recognizer(s), and/or only the word sequences that are in common on the n-best lists of the recognizer(s).

To this end, the set of possible decoder outputs may be expanded by using phonetic similarity to the one best or any of the n-best decoded items. Alternates in such a list may be determined through a transduction process, e.g., taking phonemes on the input and producing words on the output. The transduction process may use a language model on the output words, e.g., with that language model built from a database of listings and/or transcribed utterances or decoded utterances.

When the user is presented an n-best list, and rejects the items (e.g., as happens in Windows Live™ Search for Mobile), one implementation uses phonetically similar word sequences. One known process for finding word sequences which are close matches to a decoded phonetic sequence is presented in Zweig and Nedel, "Multilingual Phone-to-Word Transduction," ICASSP 2008.

When using common word sequences, the set of listings that is considered in one implementation may be restricted to those which have at least one word in common with a word sequence on the decoded n-best list. The set of such reasonable/possible word sequences given the history of the system interaction are stored in the system, as generally represented by block 232.

By way of example, "Police" may appear in a word sequence among the n-best alternate recognition results for both the initial utterance ($w_1$). All listings L with the word "police" are added to the set Sigma of listings that is summed over as described above.

In this manner, only pairs of words/hypotheses with some possibility of making sense together are used in the computations, thus limiting the number of computations that are performed to a practical number.

In one implementation, the computation of $P(w_1|L)$ and $P(w_2|L,w_1)$ models the structure that is present in the way in which people make repeated requests. For example, analysis of the set of data shown in Table 1 above indicates that there is a forty-six percent chance that the second utterance will be an exact repetition of the first; the next most common case is when the repetition is a prefix of the first, which occurs approximately sixteen percent of the time (e.g. "Joe's Italian Restaurant," "Joe's"). Similarly, the frequency with the next most likely occurrence is a suffix of the first (e.g. "Bob Shady's Gulfport Used Cars," "Gulfport Used Cars") or other structured transformation can be computed.

To further increase the accuracy of the analysis, the recognition of the second and subsequent repeated utterances may use adapted language and acoustic models. These models are represented in FIG. 2 via the acoustic model adaptation module 234 and language model adaptation module 236, respectively. These are fed back for subsequent recognition for repeated input, and also may be used in (e.g., offline) re-training of the recognizer 224. Any of known speech adaptive transforms may be used.

To accomplish such a probability estimation with a mixture of language models, repetitions that may not be identical, but which derive from reference to a finite set of entities are also decoded, such as is found in directory assistance applications, or in voice-search more generally. For two utterances (one repeated), the P(l) part captures the prior distribution for the set of listings, while $P(w_1|l)$, can be thought of as a translation model that maps from the written form of a listing l to a corresponding spoken form w. The $P(w_2|w_1, l)$, captures how users repeat themselves, at the language level, which can be thought of as a repetition language model. Two other parts in the factorization, $P(a_1|w_1)$ and $P(a_2|w_2)$ represent the acoustic scores for the corresponding utterances.

A characteristic of a joint decoding model as described herein is that the multiple utterances are "tied together" by the assumption of a single underlying concept. In the directory assistance application, for example, the underlying concept may be a set of approximate names for businesses with toll-free numbers. Note that in the case of a voice search application with a finite set of listings, the problem may be finding the likeliest listing, with less concern about the words themselves. In this case, the problem to solve is:

$$\text{argmax}_l P(l|a_1, a_2) = \text{argmax}_l \sum_{w_1,w_2} P(l, w_1,$$

$$w_2|a_1, a_2) \approx \text{argmax}_l \sum_{w_1,w_2} P(l)P(w_1|l)P(w_2|l, w_1)P(a_1|w_1)P(a_2|w_2)$$

Notwithstanding, this is only one alternative to more accurately recovering the spoken words themselves. Moreover, ordinarily both $w_1$ and $w_2$ are deduced (rather than $w_2$ alone) because $w_1$ may never be presented to the user for confirmation, (when the system has low confidence), and is therefore unknown. Note that if only interested in w, the procedures may be used by summing rather than maximizing over $w_1$. Further, note that solving at the lexical (rather than semantic) level provides added benefits in an application that needs to perform explicit or implicit confirmation actions.

Figure 3:
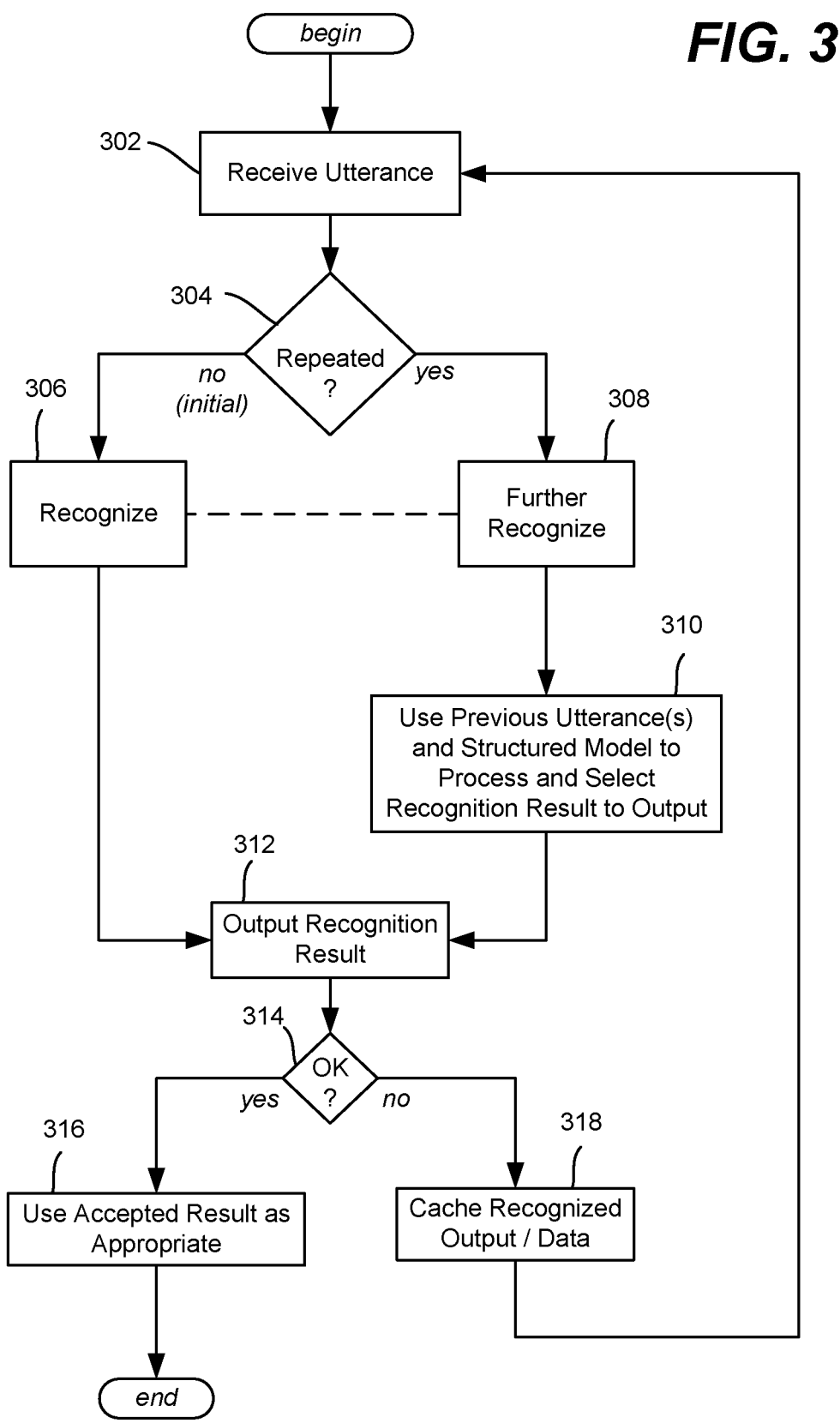
FIG. 3 is a flow diagram showing example steps that may be taken to handle utterances and repeated utterances.

FIG. 3 summarizes some of the aspects described above for an automated directory assistance application or similar such application. At step 302, the user inputs speech which is received as an utterance. Step 304 represents evaluating whether this is a repeated utterance or an initial utterance.

If initial, the speech is recognized at step 306 and output to the user at step 312, e.g., as a prompt for confirmation. Note that recognition may take place the moment that speech is received for purposes of efficiency, however as described herein, in one alternative, a different recognizer may be selected for repeated speech versus initial speech, whereby recognition may follow the determination at step 304.

If at step 314 the recognized result is confirmed as OK, then the result is used in some way at step 316, e.g., to provide a telephone number, connect the user to that number, and so forth. If not OK, step 318 caches the recognized output/data (e.g., acoustic data) for use in subsequent analysis, as described above. The process then returns to step 302 to receive another utterance, delaying as appropriate until received.

In the example herein, this time step 304 indicates that the utterance is being repeated, whereby the second utterance is recognized at step 308, possibly by a different recognizer model. Step 310 represents using the above-described combined speech analysis to compute and select a most-probable recognition result (or set of results) for the second utterance. This is then output at step 312. The process continues until the user confirms that the result is OK at step 314.

Note that although not explicitly shown in FIG. 3, it is understood that other ways to exit the process are present, e.g., a user disconnect may be detected, too long of a silence when awaiting an utterance or confirmation may time out the process and/or the number of retry loops may be limited (to prevent intentional tying up of the service's resources), or a user may be given speech or text-based prompts providing assistance so as to minimize frustration, and so forth.

Exemplary Operating Environment

Figure 4:
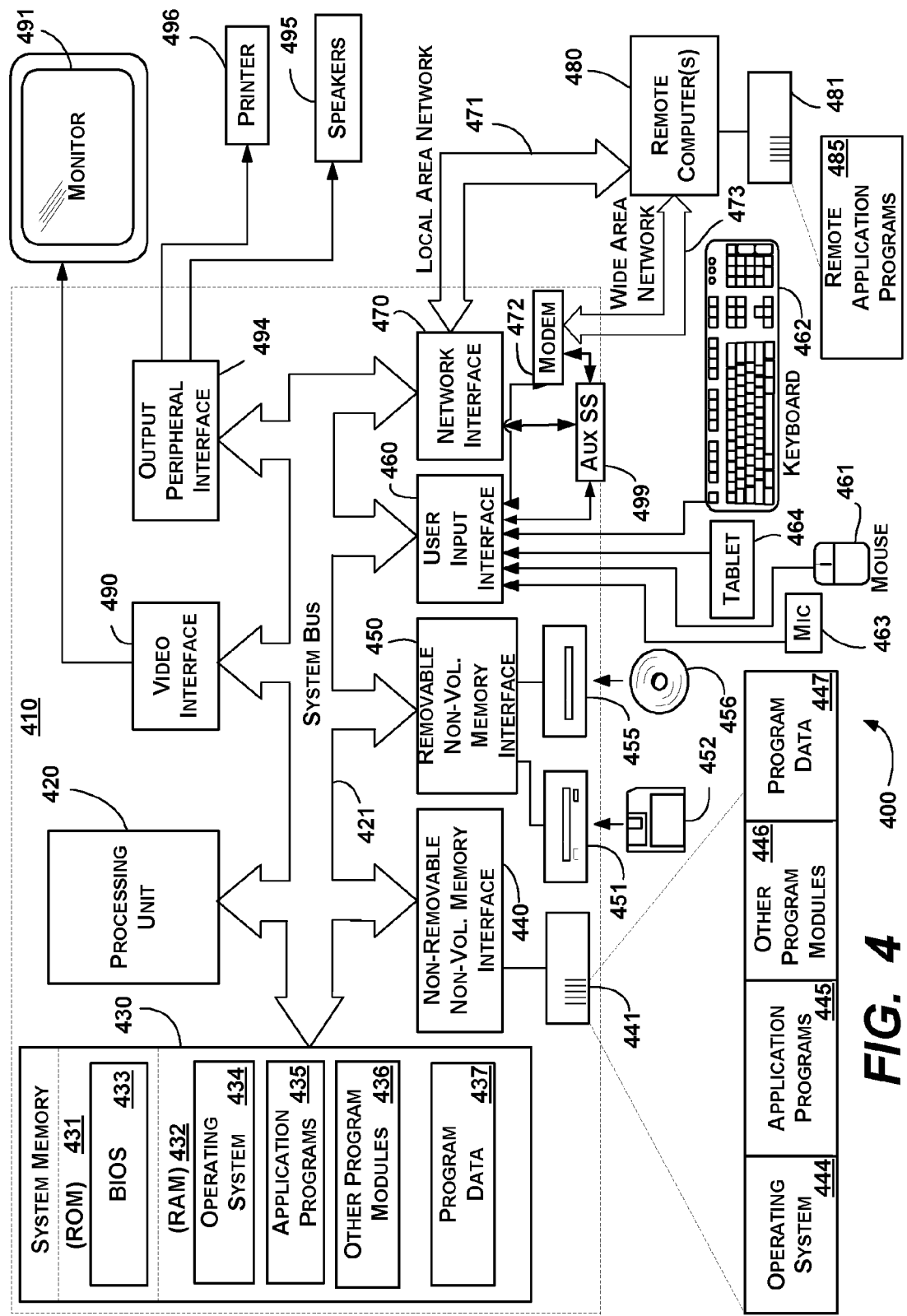
FIG. 4 shows an illustrative example of a general-purpose network computing environment into which various aspects of the present invention may be incorporated.

FIG. 4 illustrates an example of a suitable computing system environment 400 on which the turbo-scrolling examples represented in FIGS. 1-3 may be implemented, such as on a remote-controlled media center personal computer. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a remote control (R/C) 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method, comprising, receiving two or more adjacent utterances, in which a later utterance is structurally related to an earlier utterance by repetition, using a structured model of repetition to determine an intention associated with at least one of the utterances, recognizing the utterances as separate sets of word sequences, and wherein using the structured model of repetition comprises performing a joint probability analysis on the word sequences and associated acoustic data, and using word sequences common to the sets of word sequences to select only a subset of the word sequences for the joint probability analysis.

2. The method of claim 1 wherein using the structured model of repetition to determine the intention comprises attempting to determine exact words spoken by a user, or selecting at least one entry from among a fixed set of database entries, or both attempting to determine exact words spoken by a user and selecting at least one entry from among a fixed set of database entries.

3. The method of claim 1 wherein the later utterance is a repeated utterance relative to the earlier utterance that occurs in a session having utterances.

4. The method of claim 3 further comprising using data from a separate session for recognizing the later utterance.

5. The method of claim 1 further comprising, using phonetic similarity to select only a subset of the word sequences for the joint probability analysis.

6. The method of claim 5 further comprising, using a transduction process that takes phonemes as input and produces words as output to determine the subset.

7. The method of claim 6 wherein the transduction process uses a language model on the output, in which the language model is built from a set of listings, transcribed utterances, or decoded utterances, or any combination of a set of listings, transcribed utterances, or decoded utterances.

8. The method of claim 1 further comprising, using a statistical user model that makes one or more inferences about at least one guess corresponding to a later utterance that was made regarding a misrecognized previous utterance.

9. The method of claim 1 wherein recognizing the utterances comprises using at least one speech recognizer that is different from a speech recognizer used in recognizing the earlier utterance.

10. The method of claim 1 wherein using the structured model comprises determining that the second utterance is an extension of the first utterance, including that the second utterance adds at least one word before the first utterance, or adds at least one word after the first utterance, or both adds at least one word before the first utterance and adds at least one word after the first utterance.

11. The method of claim 1 wherein using the structured model comprises determining that the second utterance is a truncation of the first utterance, including that the second utterance has removed at least one word before the first utterance, or removed at least one word after the first utterance, or both removed at least one word before the first utterance and removed at least one word after the first utterance.

12. The method of claim 1 wherein using the structured model comprises determining that the second utterance spells at least part of one word that was spoken in the first utterance.

13. The method of claim 1 wherein structured model of repetition comprises a set of one or more features used in a generative probabilistic model, or a set of one or more features used in a maximum entropy model.

14. In a computing environment, a system comprising, at least one processor, a memory communicatively coupled to the at least one processor and including components comprising, a repeat analysis mechanism that processes speech recognition results differently based on whether input speech is an initial input, or is repeated input speech that includes a structural transformation of the initial input, and, when the input speech is the repeated input speech, the repeat analysis mechanism configured to combine recognition data corresponding to the repeated input speech with recognition data corresponding to the prior input speech to provide a recognition result for that repeated input speech, the recognition result based upon one or more structural features corresponding to the repeated input speech in relation to the prior input speech, wherein the repeat analysis mechanism dynamically limits the recognition data corresponding to the repeated input speech that is combined with the recognition data corresponding to the prior input speech.

15. The system of claim 14 wherein the repeat analysis mechanism is coupled to an automatic speech recognizer that provides recognition data for the initial input, and a different automatic speech recognizer that provides recognition data corresponding to the repeated input speech.

16. The system of claim 14 wherein the repeat analysis mechanism selects a recognition result by selecting at least one listing from a finite set of listings or selecting at least one most probable set of one or more words corresponding the repeated input speech.

17. One or more computer-readable storage media having computer-executable instructions, which when executed perform steps, comprising, receiving an utterance, determining if the utterance is a structural transformation comprising at least one of an extension, a truncation, or at least a partial spelling of a prior utterance from a same speaker as the utterance, and if so, using word sequence data corresponding to recognition of the prior utterance in combination with word sequence data corresponding to recognition of the utterance to select a recognition result for the utterance comprising performing a joint probability analysis on the word sequence data corresponding to recognition of the utterance and associated acoustic data and using the word sequence data corresponding to recognition of the prior utterance and the word sequence data corresponding to recognition of the utterance to select a subset of the word sequences for the joint probability analysis and wherein at least one speech recognizer that is different from a speech recognizer used in recognizing the prior utterance.

18. The one or more computer-readable storage media of claim 17 wherein selecting a recognition result comprises selecting at least one listing from a finite set of listings, or selecting at least one most probable set of one or more words corresponding to the second utterance.

19. The one or more computer-readable storage media of claim 17 wherein the utterance is a repeated utterance relative to a prior utterance that occurs in a session having two or more utterances, and having computer-executable instructions comprising, using data from a separate session as part of selecting the recognition result for the repeated utterance.

* * * * *